United States Patent
Nakagawa et al.

(10) Patent No.: US 10,906,515 B2
(45) Date of Patent: Feb. 2, 2021

(54) COLLISION AVOIDANCE CONTROL DEVICE AND COLLISION AVOIDANCE CONTROL METHOD FOR VEHICLE

(71) Applicant: ADVICS CO., LTD., Kariya-shi (JP)

(72) Inventors: Yusuke Nakagawa, Nagoya (JP); Yosuke Ohmori, Kariya (JP); Wataru Ike, Toyota (JP)

(73) Assignee: ADVICS CO., LTD., Kariya-shi (JP)

( * ) Notice: Subject to any disclaimer, the term of this patent is extended or adjusted under 35 U.S.C. 154(b) by 5 days.

(21) Appl. No.: 15/744,142

(22) PCT Filed: Jul. 12, 2016

(86) PCT No.: PCT/JP2016/070615
§ 371 (c)(1),
(2) Date: Jan. 12, 2018

(87) PCT Pub. No.: WO2017/014113
PCT Pub. Date: Jan. 26, 2017

(65) Prior Publication Data
US 2018/0201238 A1      Jul. 19, 2018

(30) Foreign Application Priority Data

Jul. 17, 2015   (JP) .................................. 2015-143478

(51) Int. Cl.
*B60T 7/22*       (2006.01)
*B60T 7/12*       (2006.01)
(Continued)

(52) U.S. Cl.
CPC ................ *B60T 7/22* (2013.01); *B60T 7/042* (2013.01); *B60T 7/12* (2013.01); *B60T 8/00* (2013.01);
(Continued)

(58) Field of Classification Search
CPC ....................................................... B60T 7/22
See application file for complete search history.

(56) References Cited

U.S. PATENT DOCUMENTS

| | | | |
|---|---|---|---|
| 6,922,624 B2 * | 7/2005 | Isaji ......................... | B60T 7/12 340/435 |
| 7,018,004 B2 * | 3/2006 | Chen ........................ | B60T 7/22 188/1.11 R |

(Continued)

FOREIGN PATENT DOCUMENTS

| | | |
|---|---|---|
| DE | 10 2008 045 481 A1 | 5/2009 |
| DE | 10 2010 049 351 A1 | 4/2012 |

(Continued)

OTHER PUBLICATIONS

International Search Report dated Sep. 6, 2016 in PCT/JP2016/070615, filed on Jul. 12, 2016.

(Continued)

*Primary Examiner* — Michael A Berns
(74) *Attorney, Agent, or Firm* — Oblon, McClelland, Maier & Neustadt, L.L.P.

(57) ABSTRACT

In a collision avoidance control device for a vehicle according to an embodiment, for example, when receiving a brake request from a driver while a brake device is given an operational instruction corresponding to a third deceleration, a brake controller controls at least the brake device to decelerate the vehicle at a deceleration calculated by adding the third deceleration and a fourth deceleration corresponding to the brake request.

3 Claims, 4 Drawing Sheets

(51) Int. Cl.
*B60T 8/00* (2006.01)
*B60T 7/04* (2006.01)
*B60T 8/172* (2006.01)
*G08G 1/16* (2006.01)

(52) U.S. Cl.
CPC ............... *B60T 8/172* (2013.01); *G08G 1/16* (2013.01); *B60T 2201/022* (2013.01); *B60T 2201/12* (2013.01); *B60T 2220/04* (2013.01)

(56) References Cited

U.S. PATENT DOCUMENTS

| | | | | |
|---|---|---|---|---|
| 8,577,550 | B2* | 11/2013 | Lu | B60W 10/06 340/435 |
| 9,079,571 | B2* | 7/2015 | Trost | B60T 7/22 |
| 2004/0122578 | A1 | 6/2004 | Isaji et al. | |
| 2010/0114445 | A1* | 5/2010 | Groult | B60T 7/22 701/70 |
| 2013/0110370 | A1 | 5/2013 | Inomata | |
| 2013/0211687 | A1 | 8/2013 | Trost et al. | |
| 2016/0280190 | A1* | 9/2016 | Franz | G08G 1/166 |
| 2018/0194347 | A1* | 7/2018 | Nakagawa | B60T 7/12 |
| 2018/0201239 | A1* | 7/2018 | Nakagawa | B60T 7/22 |

FOREIGN PATENT DOCUMENTS

| | | |
|---|---|---|
| DE | 10 2011 103 936 A1 | 12/2012 |
| EP | 2 287 059 A2 | 2/2011 |
| EP | 2 407 358 A1 | 1/2012 |
| JP | 2006-111084 A | 4/2006 |
| JP | 2007-118880 A | 5/2007 |
| JP | 2007-320482 A | 12/2007 |
| JP | 2012-121534 A | 6/2012 |
| JP | 5267963 B1 | 5/2013 |

OTHER PUBLICATIONS

Extended European Search Report dated Jan. 25, 2019 in European Patent Application No. 16827673.1, 7 pages.

* cited by examiner

COLLISION AVOIDANCE CONTROL DEVICE AND COLLISION AVOIDANCE CONTROL METHOD FOR VEHICLE

CROSS-REFERENCE TO RELATED APPLICATIONS

This application is a United States National Stage Application of International, Application No. PCT/JP2016/070615, filed Jul. 12, 2016, which designates the United States, and which is based upon and claims the benefit of priority from Japanese Patent Application No. 2015-143478, filed Jul. 17, 2015. The entire contents of each of the above applications are hereby incorporated by reference herein in entirety.

TECHNICAL FIELD

The present invention relates to a collision avoidance control device and a collision avoidance control method for a vehicle.

BACKGROUND ART

Conventionally, there has been known a collision avoidance control device for a vehicle that controls the vehicle to avoid collision with an obstacle ahead based on data acquired in traveling (see, for example, Patent Document 1).

CITATION LIST

Patent Literature

Patent Document 1: Japanese Laid-open Patent Publication No. 2012-121534

SUMMARY OF INVENTION

Problem to be Solved by the Invention

However, upon receiving a brake request from a driver through a brake pedal operation while a given deceleration is generated in the vehicle by the collision avoidance control, the collision avoidance control device for the vehicle as described above may give priority to the driver's brake request and stop the activation of the collision avoidance control. In this case, when resuming the collision avoidance control that has been stopped, the collision avoidance control device may fail to achieve an initially intended deceleration at the beginning of the control.

It is an object of the present invention to provide a collision avoidance control device for a vehicle that can control the vehicle to achieve, for example, both an intended deceleration by collision avoidance control and a driver's intended deceleration.

Means for Solving Problem

A collision avoidance control device for a vehicle according to the present invention comprises, for example, a determiner configured to determine whether to perform collision avoidance control to avoid collision with an obstacle ahead based on data acquired in traveling; and a brake controller configured to control, upon determination to perform the collision avoidance control by the determiner, at least a brake device to decelerate the vehicle at a first deceleration for a certain period and then to decelerate the vehicle at a second deceleration greater than the first deceleration, and to give an operational instruction to generate a third deceleration smaller than the first deceleration to the brake device before the certain period, wherein when receiving a brake request from a driver while the brake device is given the operational instruction corresponding to the third deceleration, the brake controller controls at least the brake device to decelerate the vehicle at a deceleration calculated by adding the third deceleration and a fourth deceleration corresponding to the brake request.

According to the above-described collision avoidance control device for the vehicle, when receiving the driver's brake request while the brake device is given an operational instruction corresponding to the third deceleration before the certain period, the vehicle is controlled to decelerate at the deceleration calculated by adding the third deceleration and the fourth deceleration corresponding to the brake request from the driver. Thus, the above-described collision avoidance control device for the vehicle can perform collision avoidance control to produce the added deceleration even during the driver's operation, and can control the vehicle to achieve the deceleration intended by the driver's brake operation, for example.

A collision avoidance control method for a vehicle according to the present invention causes a computer to perform, for example, determining whether to perform collision avoidance control to avoid collision with an obstacle ahead based on data acquired in traveling; controlling, upon determination to perform the collision avoidance control, at least a brake device to decelerate the vehicle at a first deceleration for a certain period and then to decelerate the vehicle at a second deceleration greater than the first deceleration; and giving an operational instruction to generate a third deceleration smaller than the first deceleration to the brake device before the certain period, wherein when receiving a brake request from a driver while the brake device is given the operational instruction corresponding to the third deceleration, at least the brake device is controlled to decelerate the vehicle at a deceleration calculated by adding the third deceleration and a fourth deceleration corresponding to the brake request.

According to the above-described collision avoidance control method for the vehicle, when receiving the driver's brake request while the brake device is given an operational instruction corresponding to the third deceleration before the certain period, the vehicle is controlled to decelerate at the deceleration calculated by adding the third deceleration and the fourth deceleration corresponding to the brake request from the driver. Thus, the above-described collision avoidance control method for the vehicle can perform collision avoidance control to produce the added deceleration even during the driver's operation, and can control the vehicle to achieve the deceleration intended by the driver's brake operation, for example.

DESCRIPTION OF EMBODIMENT

An exemplary embodiment of the present invention will be described below. Configurations of the embodiment described below and functions and results (effects) brought by the configurations are presented for illustrative purposes only. The present invention can be implemented by other configurations than those disclosed in the embodiment below. The present invention can attain at least one of the effects (including derivative effects) that are brought by the configurations.

The following describes, as an example, a situation that units/elements of a vehicle 100 are controlled to avoid collision with an obstacle ahead while the vehicle 100 is traveling forward.

Figure 1:
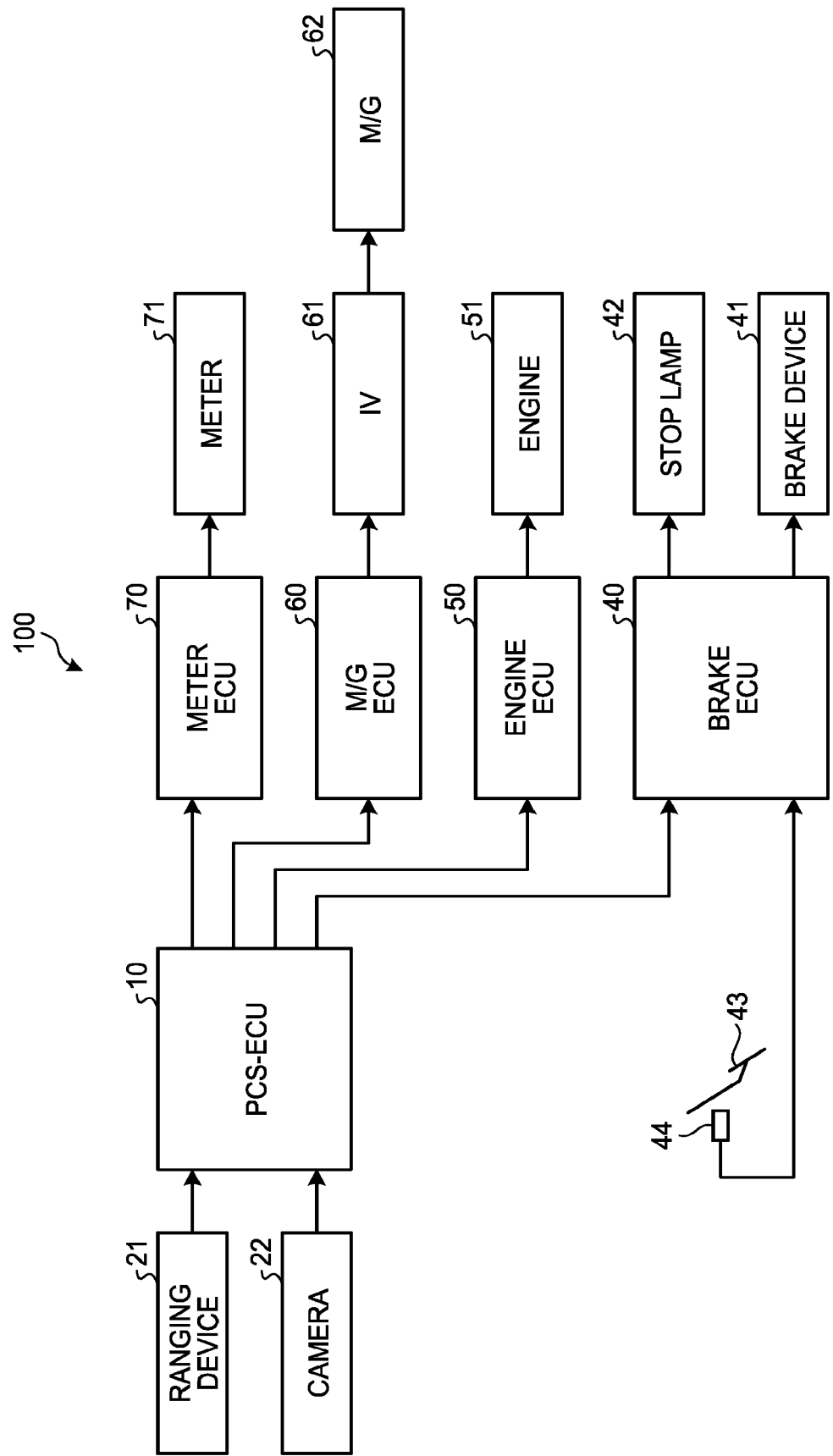
FIG. 1 is an exemplary schematic diagram illustrating a configuration of a vehicle in which a collision avoidance control device for the vehicle according to an embodiment is installed.

FIG. 1 is an exemplary schematic view illustrating a configuration of the vehicle 100. As illustrated in FIG. 1, the vehicle 100 includes, for example, an engine 51, a motor generator (M/G) 62, and a brake device 41. The engine 51 and the motor generator 62 accelerate the vehicle 100. In this regard, the engine 51 and the motor generator 62 may be referred to as a propulsion source or propulsion device. The vehicle 100 may include at least either the engine 51 or the motor generator 62 as its propulsion source. Acceleration of the vehicle 100 corresponds to an increase with time (time derivative) in velocity of the vehicle 100 traveling forward, and deceleration of the vehicle 100 corresponds to a decrease with time (time derivative) in velocity of the vehicle 100 traveling forward. In this regard, acceleration is also negative deceleration, and deceleration is also negative acceleration. In other words, as breaking force of the brake device 41, that is, a deceleration decreases, an acceleration increases, whereas, as propulsion force of the engine 51 or the motor generator 62, that is, an acceleration decreases, a deceleration increases.

The vehicle 100 includes a pre-crash safety electronic control unit (PCS-ECU) 10. When an obstacle is detected ahead of the vehicle 100, the PCS-ECU 10 determines whether there is a possibility of collision with the obstacle, on the basis of data acquired in traveling. When determining that collision is possible, the PCS-ECU 10 gives instructions to, for example, a brake ECU 40, an engine ECU 50, and a motor generator ECU (M/G ECU) 60 that control the brake device 41, the engine 51, and the motor generator 62 to avoid collision with the obstacle. The PCS-ECU 10 is an example of a determiner. In the present embodiment, although the PCS-ECU 10 gives instructions for controlling the acceleration or deceleration of the vehicle 100, that is, propulsion force or braking force, the PCS-ECU 10 may also give instructions for controlling the steering of the vehicle 100.

The PCS-ECU 10 includes a control unit such as a central processing unit (CPU) or a controller, and storage units such as a read only memory (ROM), a random access memory (RAM), and a flash memory. The storage units may store therein, for example, a computer program for causing the PCS-ECU 10 to operate and data for use in arithmetic processing of the PCS-ECU 10.

The vehicle 100 includes a ranging device 21 and a camera 22. The ranging device 21 and the camera 22 are examples of obstacle detectors.

The ranging device 21 wirelessly and contactlessly measures a distance to the obstacle and is, for example, a radar device or a sonar device. The PCS-ECU 10 acquires from the ranging device 21 data indicating the distance to the obstacle. In this case, the data indicating the distance may be numeric data indicating the distance itself or data indicating a value corresponding to the distance.

The camera 22 is a digital camera including an imaging device such as a charge-coupled device (CCD) or a CMOS image sensor (CIS). The camera 22 can output video data at a certain frame rate. The PCS-ECU 10 may acquire a distance to the obstacle by acquiring data indicating an image captured by the camera 22 and using this image data.

Various sensors, which are not illustrated, are installed in the vehicle 100 and data indicating sensing results is input from the sensors to the PCS-ECU 10. The sensors installed in the vehicle 100 may include sensors that output results of detection of the state of the vehicle 100. Examples of the sensors that output results of detection of the state of the vehicle 100 include a speed sensor, an accelerometer, and a gyro sensor.

The sensors installed in the vehicle 100 may include sensors that output results of detection of an amount of operation or a required amount of operation of an operating element by the driver. Examples of the operating element to be operated by the driver include an accelerator pedal, a brake pedal, a brake handle, a steering wheel, and switches.

The sensors installed in the vehicle 100 may include sensors that output results of detection of the states of any devices installed in the vehicle 100. Examples of the devices installed in the vehicle 100 include the brake device 41, the engine 51, the motor generator 62, an inverter (IV) 61, a steering system, and a suspension system. Examples of physical quantities to be detected by the sensors installed in the vehicle 100 include distance, displacement, velocity, acceleration, rotational speed, angle, angular velocity, and angular acceleration. The PCS-ECU 10 may receive numerical data indicating each physical quantity itself, and may receive data indicating a value corresponding to a level or intensity of each physical quantity.

The data to input to the PCS-ECU 10 may be digital data, analogue data such as potential having no digitized value, or data that corresponds to not a value of a physical quantity but on/off states or individual phases.

To perform collision avoidance control, the PCS-ECU 10 calculates an estimated time for the vehicle 100 to collide with an obstacle ahead, that is, a time to collision (TTC). As a simplest example, the PCS-ECU 10 can calculate TTC by an expression:

$$TTC = Ds/Vr$$

where Ds represents the distance to the obstacle and Vr represents the relative velocity of the vehicle 100 to the obstacle. TTC may be calculated in consideration of a relative acceleration of the obstacle and a deceleration of the vehicle 100. When, for example, TTC is equal to or smaller than a certain value, the PCS-ECU 10 can determine a possibility of collision.

The PCS-ECU 10 calculates the acceleration or deceleration of the vehicle 100 for the collision avoidance control. The PCS-ECU 10 is an example of a collision avoidance controller.

The brake ECU 40 controls the brake device 41 such that an acceleration or a deceleration set by the PCS-ECU 10 is achieved. The brake ECU 40 receives a signal indicating a value corresponding to a stroke of a brake pedal 43, that is, an amount of operation of the brake pedal 43 from a sensor 44. The brake ECU 40 is an example of a brake controller. The engine ECU 50 controls the engine 51 such that an acceleration or a deceleration set by the PCS-ECU 10 is achieved. The motor generator ECU 60 controls the inverter 61 such that the motor generator 62 operates to achieve an acceleration or a deceleration set by the PCS-ECU 10.

The brake ECU 40 can control a stop lamp 42 mounted on the rear end of the vehicle 100 to light up. Lighting-up of the stop lamp 42 may be an indication of warning to the periphery of the vehicle 100, for example, to the vehicles behind. A meter ECU 70 can control a meter 71 mounted on, for example, an instrument panel to display a warning. The display output of the meter 71 may work as an indication of warning to the driver or passengers in a vehicle cabin. The stop lamp 42 and the meter 71 may be referred to as warning output devices, output devices, warning devices, or display output devices. An audible output may be output from a sound output device, which is not illustrated. The sound output device is, for example, a speaker or a buzzer, and may be referred to as a warning output device, output device, or warning device.

Figure 2:
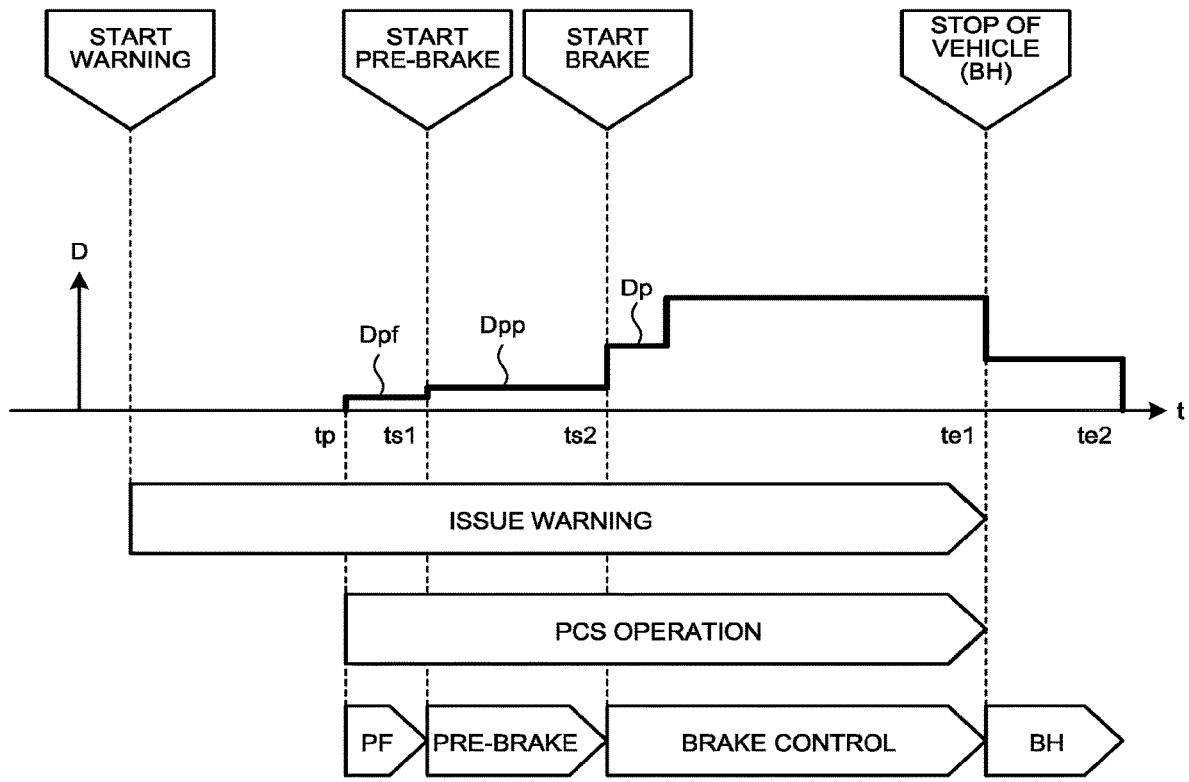
FIG. 2 is an exemplary explanatory diagram illustrating transition of control state of the collision avoidance control device for the vehicle according to the embodiment.

FIG. 2 illustrates an example of transition of control state in an automatic collision avoidance control without a brake operation by the driver. In the graph in FIG. 2, the horizontal axis represents time t and the vertical axis represents deceleration D. In FIG. 2, the vertical axis represents required values of deceleration.

The PCS-ECU 10 calculates TTC at certain time intervals from data acquired during the travel of the vehicle 100. In accordance with TTC values, the PCS-ECU 10 starts collision avoidance control, shifts the collision avoidance control to a next phase, or terminates the collision avoidance control. In other words, the PCS-ECU 10 monitors the situations relating to collision avoidance based on TTC.

First, the PCS-ECU 10 starts issuing a warning by means of, for example, the meter 71 or a speaker.

Next, the PCS-ECU 10 gives an operational instruction to the brake ECU 40 to slightly decelerate the vehicle 100 for a certain period. Thereby, the brake ECU 40 activates a pump (not illustrated) of the brake device 41 to eliminate a gap between a brake pad and a rotor or a brake disc, or between a brake shoe and a drum. This operation may be referred to as brake prefill (PF). The pump is activated by the prefill operation which increases responsiveness compared to a case in which braking force is increased from a non-activated state of the pump and also eliminates a gap or a dead stroke. This leads to increasing responsiveness of the start of the collision avoidance control.

The PCS-ECU 10 instructs the brake ECU 40 to perform a pre-brake operation for a certain period. Specifically, the PCS-ECU 10 transmits an instruction signal to the brake ECU 40 to illuminate the stop lamp 42. The PCS-ECU 10 instructs the brake ECU 40 to attain, for example, a minimum deceleration (braking force) required for illuminating the stop lamp 42, and the brake ECU 40 controls the brake device 41 as instructed. In the present embodiment, the main purpose of the pre-brake operation is to illuminate the stop lamp 42. The pre-brake operation may be set to produce a required deceleration that prompts the driver in a vehicle behind to perform a deceleration operation. The deceleration in the pre-brake operation is greater than that in the prefill operation.

The PCS-ECU 10 then instructs the brake ECU 40 to start brake control for avoiding collision. Specifically, the PCS-ECU 10 instructs the brake ECU 40 to change the velocity of the vehicle 100 at a required deceleration, that is, to apply a required braking force to the vehicle 100, and the brake ECU 40 controls the brake device 41 as instructed. In this brake control, the deceleration (braking force) may be increased incrementally. The deceleration in the brake control is greater than that in the prefill operation and the pre-brake operation.

When the vehicle 100 stops without colliding with the obstacle, the PCS-ECU 10 instructs the brake ECU 40 to maintain the vehicle 100 in a stopped state for a certain period, and the brake ECU 40 controls the brake device 41 as instructed. This operation may be referred to as brake hold (BH).

In the present embodiment, the PCS-ECU 10 can terminate the above-described collision avoidance control by a driver's operation of the acceleration pedal or the steering wheel, that is, through an acceleration request operation or a steering operation.

Figure 3:
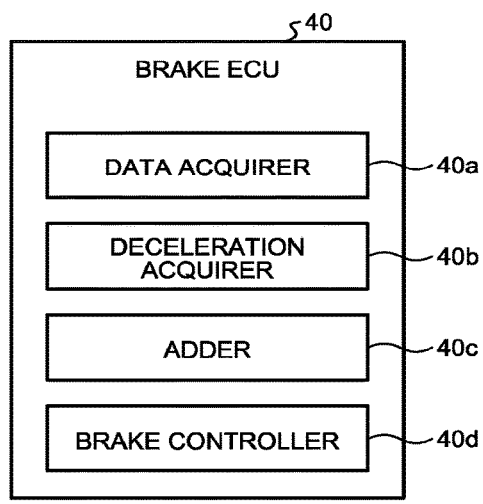
FIG. 3 is an exemplary schematic block diagram illustrating a brake electronic control unit (ECU) included in the collision avoidance control device for the vehicle according to the embodiment.

FIG. 3 illustrates an example of the brake ECU 40. The brake ECU 40 can implement various functions by performing processing in accordance with computer program(s) installed and loaded thereon. In other words, the brake ECU 40 can function, for example, as a data acquirer 40a, a deceleration acquirer 40b, an adder 40c, and a brake controller 40d by performing processing in accordance with the computer program(s). At least one of the functions of the above modules may be implemented by hardware.

The data acquirer 40a acquires data for use in the brake control. Examples of the data for use in the brake control may include data indicating a deceleration from the PCS-ECU 10, that is, a required deceleration, and include data from the sensor 44 indicating an amount of operation of the brake pedal 43.

The deceleration acquirer 40b acquires a deceleration corresponding to an amount of operation of the brake pedal 43, that is, a deceleration corresponding to a brake request from the driver. The deceleration acquired herein is irrelevant to the activation or non-activation of the collision avoidance control. In other words, the deceleration corresponding to the amount of operation of the brake pedal 43 retains unchanged when the driver operates the brake pedal 43 to brake in a normal situation with no activation of collision avoidance control and when the driver operates the brake pedal 43 to brake during the collision avoidance control. The deceleration acquirer 40b acquires a deceleration corresponding to the amount of operation on the basis of, for example, data such as a map, a table, a mathematical function, or a mathematical expression stored in a storage included in the brake ECU 40.

Following the instruction from the PCS-ECU 10, the adder 40c adds the deceleration by the prefill operation of the collision avoidance control and the deceleration corresponding to the brake request from the driver acquired by the deceleration acquirer 40b.

The brake controller 40d performs the PCS operation illustrated in FIG. 2, that is, the above-described prefill, pre-brake, brake control, and brake hold operations under the collision avoidance control. When the adder 40c sums up the decelerations, the brake controller 40d controls the brake device 41 to decelerate the vehicle 100 at the deceleration obtained by the addition. The brake controller 40d can perform the brake control under vehicle behavior control different from the collision avoidance control.

Figure 4:
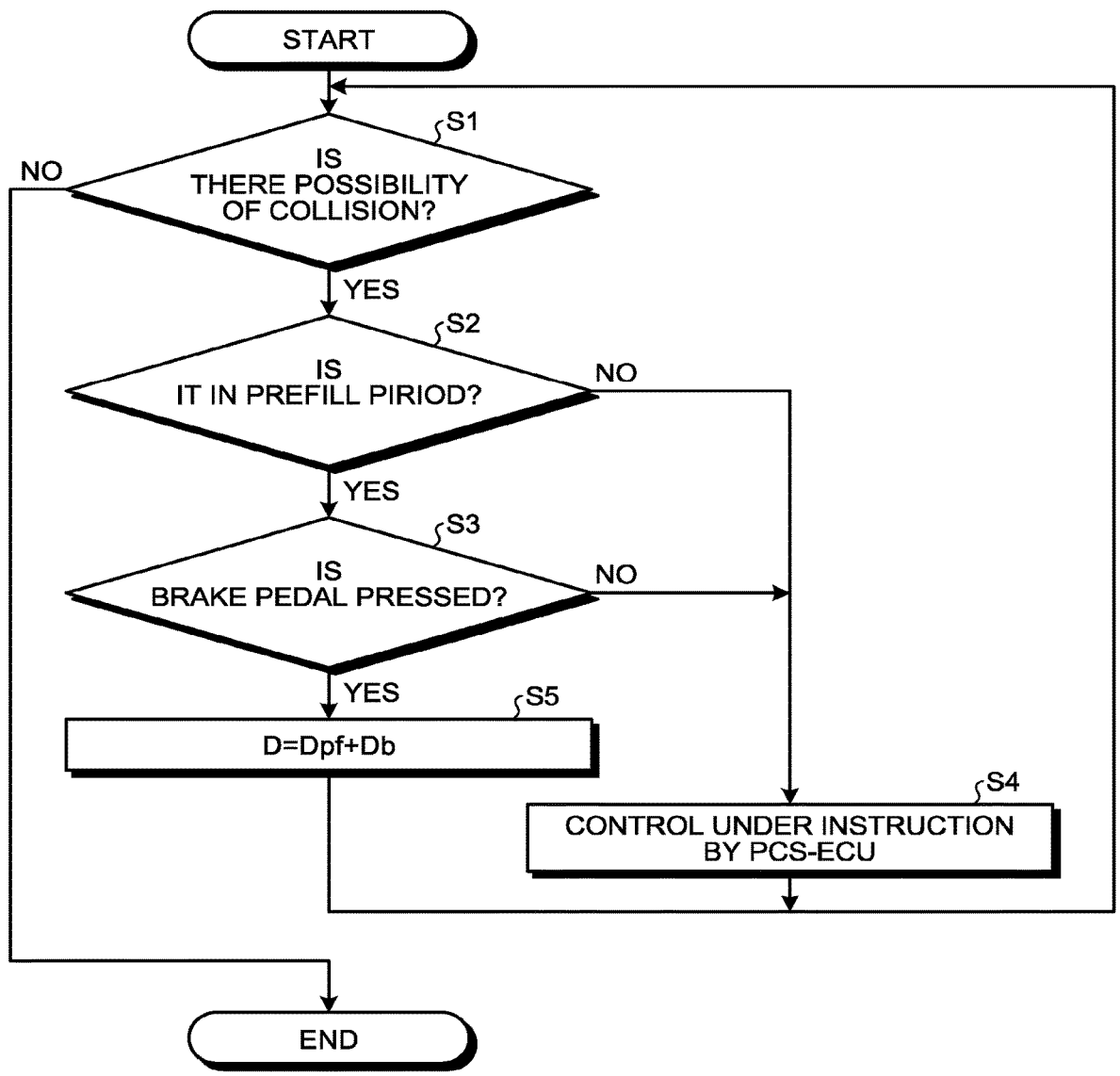
FIG. 4 is an exemplary flowchart illustrating a control performed by the collision avoidance control device for the vehicle according to the embodiment.

FIG. 4 illustrates an example of a procedure of the brake control according to the present embodiment. The processing flow illustrated in FIG. 4 is performed at certain time intervals. When the PCS-ECU 10 determines that there is a possibility of collision on the basis of TTC, specifically, for example, when TTC is equal to or smaller than a certain value (Yes at S1) and it is not during a prefill period (No at S2), control is performed to generate a certain deceleration or braking force in accordance with the instruction from the PCS-ECU 10 (S4).

With yes at S2, that is, when the brake pedal 43 is not pressed during the prefill period or when the data acquirer 40a acquires no data indicating an amount of operation of the brake pedal 43 and the deceleration acquirer 40b acquires no deceleration corresponding to the amount of operation of the brake pedal 43 (No at S3), control by the PCS-ECU 10 is performed (S4).

With yes at S3, that is, when the brake pedal 43 pressed, the adder 40c calculates a deceleration D by adding a deceleration Dpf in the prefill operation and a deceleration Db corresponding to the amount of operation of the brake pedal 43, and the brake controller 40d then controls the brake device 41 to decelerate the vehicle 100 at the deceleration D obtained by the addition of "D=Dpf+Db" (S5). Upon completion of S4 and S5, the process returns to S1. The deceleration Dpf is an example of a third deceleration, and the deceleration Db is an example of a fourth deceleration.

The present embodiment has described the example where the brake device 41 causes deceleration (applies braking force), but the braking force may be applied by the motor generator 62 or the engine 51 depending on the situation in each of the above-described steps.

Figure 5:
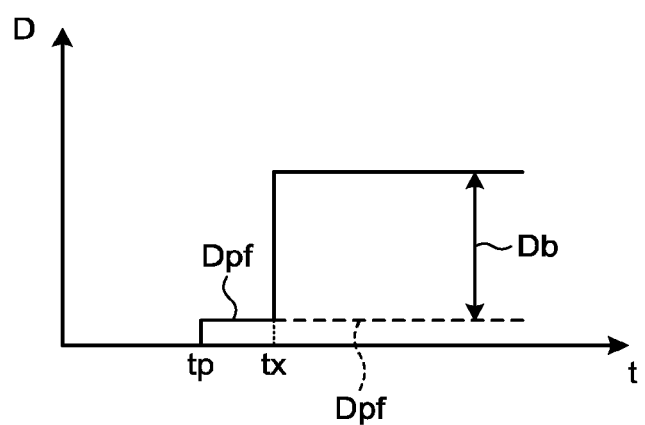
FIG. 5 is a graph illustrating an example of a change with time in deceleration of the vehicle in the collision avoidance control device for the vehicle according to the embodiment.

FIG. 5 illustrates a change with time in a deceleration caused by a driver's operation of the brake pedal 43 in a period when the prefill operation is performed, that is, in a period from time tp to time ts1 in FIG. 2. In FIG. 5, the brake controller 40d starts the prefill operation from time tp and gives to the brake device 41 an operational instruction for the deceleration Dpf. When the driver operates the brake pedal 43 at time tx before time ts1 in FIG. 2, the brake controller 40d controls the brake device 41 to decelerate the vehicle 100 at the deceleration D=Dpf+Db, which is calculated by adding the deceleration Dpf and the deceleration Db corresponding to the amount of operation of the brake pedal 43. Thereafter, as illustrated in FIG. 2, the brake controller 40d controls the brake device 41 to decelerate the vehicle 100 at a deceleration Dpp from time ts1, and controls the brake device 41 to decelerate the vehicle 100 at a deceleration Dp from time ts2. The deceleration Dpp is an example of a first deceleration and the deceleration Dp is an example of a second deceleration.

As described above, in the present embodiment, upon receiving a driver's brake request while the vehicle 100 is decelerated at the deceleration Dpf (third deceleration) by the prefill operation, the brake controller 40d controls the brake device 41 to decelerate the vehicle 100 at the deceleration D=Dpf+Db, which is calculated by adding the deceleration Dpf by the prefill operation and the deceleration Db (fourth deceleration) corresponding to the driver's brake request. This enables the vehicle 100 to achieve both of a deceleration intended for the collision avoidance control and a deceleration intended by the driver.

While a certain embodiment has been described, the embodiment has been presented by way of example only, and is not intended to limit the scope of the inventions. Indeed, the novel embodiment described herein may be embodied in a variety of other forms; furthermore, various omissions, substitutions, combinations and changes in the form of the embodiment described herein may be made without departing from the spirit of the inventions. Various modifications can be made on specifications such as configurations, parts, numbers, time, velocity, and deceleration described in the embodiment to implement the present invention.

EXPLANATIONS OF LETTERS OR NUMERALS

10 PCS-ECU (determiner)
40 Brake ECU (brake controller)
41 Brake device
100 Vehicle

The invention claimed is:

1. A collision avoidance control device for a vehicle comprising:
   a determiner configured to determine whether to perform collision avoidance control to avoid collision with an obstacle ahead, based on data acquired in traveling; and
   a brake controller configured to, upon determination to perform the collision avoidance control by the determiner,
      control at least a brake device to decelerate the vehicle at a first deceleration for a pre-brake period and to decelerate, after the pre-brake period, the vehicle at a second deceleration greater than the first deceleration, and
      give, to the brake device, an operational instruction to generate a first prefill deceleration smaller than the first deceleration, the first prefill deceleration being generated in a prefill period that is immediately before the pre-brake period, wherein,
   when a brake request from a driver is received in the prefill period during which the vehicle is decelerated with the first prefill deceleration, the brake controller controls at least the brake device to
      decelerate, until a start of the pre-brake period, the vehicle at a deceleration calculated by adding the first prefill deceleration and a second prefill deceleration corresponding to the brake request, and
      decelerate the vehicle at the first deceleration after the start of the pre-brake period.

2. A collision avoidance control method for a vehicle comprising:
   determining, using control circuitry, whether to perform collision avoidance control to avoid collision with an obstacle ahead, based on data acquired in traveling; and
   upon determination to perform the collision avoidance control,
      controlling, using a brake controller, at least a brake device to decelerate the vehicle at a first deceleration for a pre-brake period and to decelerate, after the pre-brake period, the vehicle at a second deceleration greater than the first deceleration; and
      giving, to the brake device, an operational instruction to generate a first prefill deceleration smaller than the first deceleration, the first prefill deceleration being generated in a prefill period that is immediately before the pre-brake period, wherein,
   when a brake request from a driver is received in the prefill period during which the vehicle is decelerated with the first prefill deceleration, controlling at least the brake device to
      decelerate, until a start of the pre-brake period, the vehicle at a deceleration calculated by adding the first prefill deceleration and a second prefill deceleration corresponding to the brake request, and decelerate the vehicle at the first deceleration after the start of the pre-brake period.

3. A collision avoidance control device for a vehicle comprising:

control circuitry configured to determine whether to perform collision avoidance control to avoid collision with an obstacle ahead, based on data acquired in traveling; and a brake controller configured to control, upon determination to perform the collision avoidance control by the control circuitry, at least a brake device to decelerate the vehicle at a first deceleration for a pre-brake period and to decelerate the vehicle at a second deceleration greater than the first deceleration in a brake control period that is subsequent to the pre-brake period, and provide to the brake device an operational instruction to generate a first prefill deceleration smaller than the first deceleration, the first prefill deceleration being generated in a prefill period that is immediately before the pre-brake period, wherein, when a brake request from a driver is received while the vehicle is decelerated at the first prefill deceleration, the brake controller controls at least the brake device to decelerate, until a start of the pre-brake period, the vehicle at a deceleration calculated by adding the first prefill deceleration and a second prefill deceleration corresponding to the brake request, and decelerate the vehicle at the first deceleration after the start of the pre-brake control period.

* * * * *